March 17, 1964
B. THOMPSON
3,125,199
SLOTTED COAXIAL LINE HAVING SLIDABLE TAP FOR
TRANSMISSION OF ELECTRICAL POWER
AT HIGH FREQUENCIES
Filed Sept. 6, 1960
2 Sheets-Sheet 1
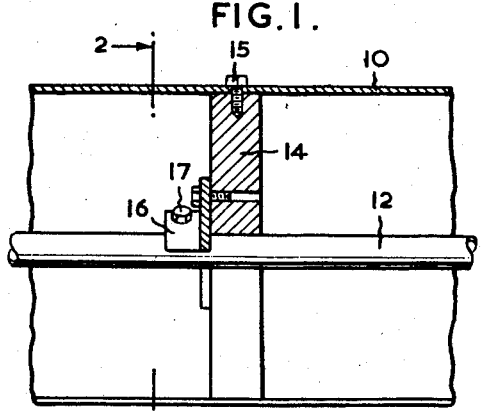
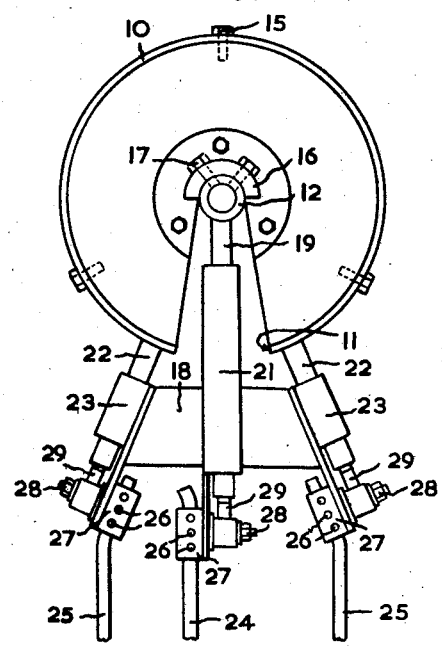
Inventor
Bernard Thompson
Attorneys
Scrivener and Parker March 17, 1964   B. THOMPSON   3,125,199
SLOTTED COAXIAL LINE HAVING SLIDABLE TAP FOR
TRANSMISSION OF ELECTRICAL POWER
AT HIGH FREQUENCIES
Filed Sept. 6, 1960   2 Sheets-Sheet 2
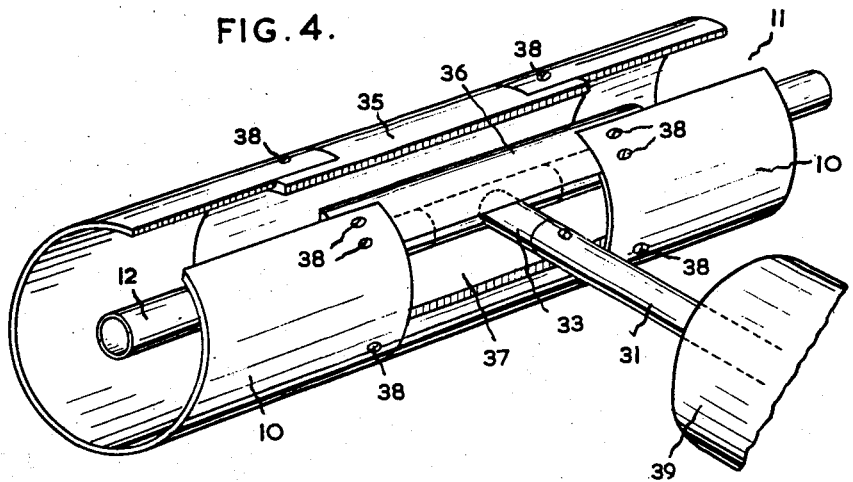
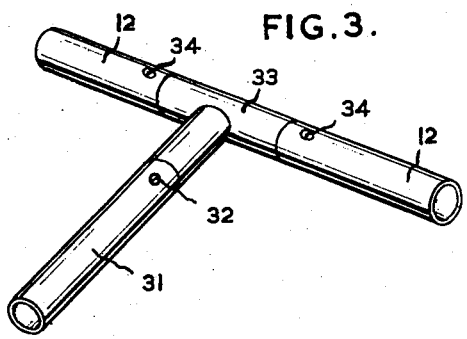
Inventor
Bernard Thompson
Attorneys
Scrivener and Parker

3,125,199
SLOTTED COAXIAL LINE HAVING SLIDABLE TAP FOR TRANSMISSION OF ELECTRICAL POWER AT HIGH FREQUENCIES
Bernard Thompson, Sutton Coldfield, England, assignor to Tube Products Limited, Birmingham, England, a British company
Filed Sept. 6, 1960, Ser. No. 54,290
1 Claim. (Cl. 191—23)

This invention relates to improvements in equipment for the transmission of electrical power at high frequencies of the order of several hundred kilocycles per second.

In the specification of our Patent No. 2,938,098 we have described equipment for the transmission of power at such frequencies from a generator to a work-head such as a welding head travelling along the length of an elongated work-piece. Current from the generator is supplied to a bus-bar comprising flat copper strips on opposite sides of and separated by a layer of insulating material, the bus-bar extending parallel to the work-piece. The welding head transformer carries spring-loaded contact brushes or plungers engaging slidably with the copper strips of the bus-bar.

The capacitance of such a bus-bar is sufficient to be very significant at the high frequencies used in the system, and the capacitive reactance of the bus-bar which is shunted across the work head may be of the same magnitude as the load impedance.

This feature may be of advantage where, for example, the load is primarily inductive, since the capacitance of the bus-bar system can be used to cancel the inductive portion of the load and so to increase the kilowatt output from the generator. In such cases the design of the capacitive bus-bar system in conjunction with the design of the work-head transformer determines the overall performance of the welding equipment, and bus-bar capacitance is a desirable feature. The use of a bus-bar of the form described above enables capacitance to be obtained very simply and cheaply compared with the use of separate capacitors.

However, where the work-head transformer and the load are such that the inductive component is small, the presence of large capacitance values in the bus-bar system is a disadvantage as reactive kva. has then to be supplied by the generator at the expense of kw. supply to the load.

In such systems, therefore, it is desirable to reduce the capacitance of the transmission system to a minimum. The capacitance of a bus-bar system as described above can be reduced by increasing the spacing between the conductors, but if that is done, the radiation loss is increased, and there is also an increase in the power lost in the dielectric.

According to our present invention, a low capacitance, low loss transmission system for conveying high frequency current to a moving work head or the like comprises a hollow conductor having a longitudinal slot, a central conductor extending axially through the hollow conductor, and brushes in sliding engagement with the conductors, the brush engaging the inner conductor extending through the longitudinal slot in the outer conductor.

Such a system has a very low capacitance in comparison with a flat bus bar system as described in patent application No. 2,938,098 and capable of carrying the same current. For example, the capacitance between a pair of flat bus bars 12 inches long, 9 inches wide, separated by a dielectric 0.125 inch thick and of permittivity 5 can be simply calculated to be about 1000 picofarad per foot of bus bar.

On the other hand, the capacitance of a bus bar system according to the invention is much less than this figure. For example, a co-axial bus bar system capable of carrying the same current as the flat bus bar system described above has an outer conductor of radius 3 inches, and an inner core of radius ½ inch separated from the outer conductor by air: its capacitance per foot can be simply calculated to be about 10 picofarad, or only 1% of the figure for the flat bus bar. A bus bar system according to the invention, will of course have a longitudinal slot in the outer or hollow conductor and thus the reduction in capacitance will not be so great as this in practice, but nevertheless the reduction will be substantial and the system has a number of other practical advantages.

The example given above is intended only to illustrate the scope of the reduction in capacitance that can be expected using a bus bar system according to the invention. It is not intended to be limiting in any way, the sizes of the conductors being chosen in practice to suit the value of current to be carried. In addition, the conductors may be of circular, square or other cross-section. The inner conductor is conveniently supported within the outer conductor and kept concentric therewith by spacers of insulating material which are secured to the outer conductor by radial screws or bolts and in which the inner conductor is secured by further screws or bolts. The spacers are gapped or slotted in alignment with the slot in the outer conductor to provide a clearance for the sliding brush engaging the inner conductor.

The brushes may be arranged in various ways.

One form of low capacitance low loss transmission system in accordance with our invention for conveying high frequency current to a moving work-head or the like is illustrated by way of example in the accompanying drawings in which:

FIGURE 1 is a longtiudinal section of a part of the system;

FIGURE 2 is a transverse section showing the brushes which take current from the conductors to the work-head or the like;

FIGURE 3 is a perspective view showing one way in which current can be taken to the central conductor at or about the middle of its length; and FIGURE 4 is an inverted perspective view of the central part of the conductor assembly showing the way in which current can be taken to the central conductor while maintaining electrical continuity of the outer conductor.

The low capacitance low loss transmission system illustrated comprises a hollow tubular outer conductor 10 of copper or other metal of high conductivity having a longitudinal slot or gap 11, and an inner conductor 12 in the form of a tube supported concentrically within the outer conductor. The inner conductor 12 is supported and kept concentric with the outer conductor by axially separated spacers 14 of insulating material which are secured to the outer conductor by radial screws or bolts 15, the spacers being slotted or gapped in alignment with the slot or gap 11 in the outer conductor. The inner conductor passes through a central opening in each spacer and is supported on one or each side of each spacer by a saddle 16 secured to the spacer and extending partially around the conductor on the side remote from the slot or gap 11. The conductor is secured to the saddle by screws 17.

Current is taken from the conductors by brushes mounted in holders carried by a slider or bracket 18 of insulating material which is itself mounted on or associated with the welding head transformer and moves in a path parallel to the outer conductor. One brush 19 is mounted in a holder 21 and is in sliding engagement with the inner conductor 12, the holder passing through the slot or gap 11 in the outer conductor. Brushes 22 mounted in holders 23 are located on each side of the holder 21 and are oppositely inclined at such angles that the brushes engage substantially radially with the surface of the outer conductor on opposite sides of the slot or gap 11. Leads 24, 25 to the workhead transformer are secured by screws 26 in clamps 27 which are secured by bolts 28 to the outer ends of the brush holders. Spiral springs 29 mounted on the bolts bear on the inner ends of the brushes to hold the brushes in close sliding contact with the conductors.

There may only be a single brush 22 engaging the outer conductor on one side of the slot or gap, but the arrangement illustrated is preferred as the load on the slider 18 is balanced by the use of two oppositely inclined brushes 22 and there is no turning moment on the slider.

Power is preferably fed to the central conductor 12 through a lead 31 connected to the conductor at about the middle of its length. In the construction shown in FIGURE 3, the free end of the lead 31 is clamped by one or more screws 32 in one limb of a T piece 33 of the same diameter as the conductor 12. The conductor is divided and spigots of reduced diameter on the ends of the opposed aligned limbs of the T piece are received in the adjacent ends of the two parts of the conductor in which they are clamped by countersunk screws 34. The surface of the T piece incorporated in the conductor is thus of the same diameter as the conductor itself and the brush 19 can slide smoothly over it.

To allow a lead to be connected to the central conductor at the middle of its length, an opening must be provided in the outer conductor 10, and one way in which this can be done is shown in FIGURE 4. The outer conductor is divided and the adjacent ends of the two parts which are spaced apart are connected by part-cylindrical bridge pieces 35, 36 between which is a longitudinal gap 37 through which the lead 31 passes. The bridge pieces are of the same radius as the conductor 10 and their outer ends are cut away or reduced to permit the ends of the conductor to fit over them with the outer surfaces of the bridge pieces on each side of the slot or gap 11 flush with the outer surface of the conductor to provide a smooth continuous path for the brushes 22. The bridge pieces are secured to the conductor by countersunk screws 38.

The lead 31 may be shielded by a tubular shield 39 which may form a return current lead and be connected to the outer conductor 10 or to one or both of the bridge pieces 35, 36.

The conductor assembly is extremely rigid and need only be supported at widely spaced intervals.

In use, the conductor assembly is mounted parallel with the elongated workpiece. The workhead for performing work on the workpiece carries the brushes 19 and 22 and is arranged to move longitudinally parallel to the workpiece and to the conductor assembly and to pick up power from the latter by means of the brushes in an arrangement which may be substantially similar to the aforementioned Patent No. 2,938,098. The slot or gap 11 in the hollow outer conductor allows free longitudinal movement of the brush 19. The workhead may be a welding machine fed by a current transformer or may be another device which consumes electrical power at high frequencies.

Normally the inner conductor will be the live high potential conductor, and as it is effectively screened by the outer conductor, which will be the earthed return, the risk of accidents is reduced to a minimum.

When using high current densities cooling water or other fluid may be circulated through the tubular inner conductor 12 to prevent an excessive rise in the temperature of that conductor which has a lower current carrying capacity than the outer conductor.

If wear of the surface of the inner conductor 12 where it is engaged by the brush 19 should become excessive, the screws 17 can be removed and the conductor can be partially rotated so that a fresh surface is brought into alignment with the brush, the screws 17 then being replaced in fresh holes.

I claim:

A low capacitance loss transmission system for conveying high tension electric current to a moving current consuming unit such as a welding head travelling along the length of an elongated workpiece, comprising a hollow cylindrical outer conductor having a longitudinal slot, an inner conductor extending axially through said outer conductor, axially separated spacers in said outer conductor supporting said inner conductor concentrically within said outer conductor, a slider of insulating material guided for movement parallel to said outer conductor, a current collecting brush mounted on said slider and extending through said longitudinal slot in the outer conductor into sliding engagement with said inner conductor, and two oppositely inclined current collecting brushes mounted on said slider and engaging substantially radially with the outer conductor on opposite sides of said longitudinal slot.

References Cited in the file of this patent

UNITED STATES PATENTS

| | | |
|---|---|---|
| 457,105 | Boynton | Aug. 4, 1891 |
| 2,038,240 | Schelkunoff | Apr. 21, 1936 |
| 2,474,475 | Ringe | Sept. 16, 1947 |
| 2,485,031 | Bradley | Oct. 18, 1949 |
| 2,603,707 | Jaynes | July 15, 1952 |
| 2,844,800 | Ellis | July 22, 1958 |
| 2,918,636 | Shapiro | Dec. 22, 1959 |